April 21, 1936.　　　F. H. JOHNSTON ET AL　　　2,037,796
ABRADING OR CUTTING APPARATUS
Filed March 29, 1933　　　3 Sheets-Sheet 1

Inventors
Frank H. Johnston
Alvan R. Lambert

Joseph W. Crockett
Their Attorney

April 21, 1936.  F. H. JOHNSTON ET AL  2,037,796
ABRADING OR CUTTING APPARATUS
Filed March 29, 1933   3 Sheets-Sheet 2

Inventors
Frank H. Johnston
Alvan R. Lambert
By Joseph W. Crockett
Their Attorney April 21, 1936.  F. H. JOHNSTON ET AL  2,037,796
ABRADING OR CUTTING APPARATUS
Filed March 29, 1933   3 Sheets-Sheet 3

Inventors
Frank H. Johnston
Alvan R. Lambert
By Joseph W. Crockett
Their Attorney Patented Apr. 21, 1936

2,037,796

UNITED STATES PATENT OFFICE 2,037,796

ABRADING OR CUTTING APPARATUS

Frank H. Johnston, Dayton, and Alvan R. Lambert, Oakwood, Ohio, assignors to The Ohio Units Incorporated, Dayton, Ohio, a corporation of Ohio Application March 29, 1933, Serial No. 663,304

1 Claim. (Cl. 51—101)

The present invention relates to abrading or cutting apparatus, and more particularly to a device for grinding or cutting articles into various shapes.

One of the objects of the present invention is to provide a machine that will grind or cut an article in a shape that is elliptical, or some other configuration that is out of round.

Another object is to provide a machine that will make it possible to vary the degree that such article is out of round, merely by the use of an adjusting device, as distinguished from the use of separate mechanism.

Another object is to provide a machine that will grind or cut an article into a shape that is tapered axially, as well as out of round radially.

Another object is to provide a machine that will so shape the article in a single operation.

Another object is to provide a machine that causes the radial feeding to be done positively instead of by spring means.

Another object is to provide a machine having a mechanism for varying the amount of axial taper by a simple adjustment instead of by providing additional mechanism.

Another object is to make the control element easily adjustable in reference to the angular position of the article being worked.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

General description

Figure 1:
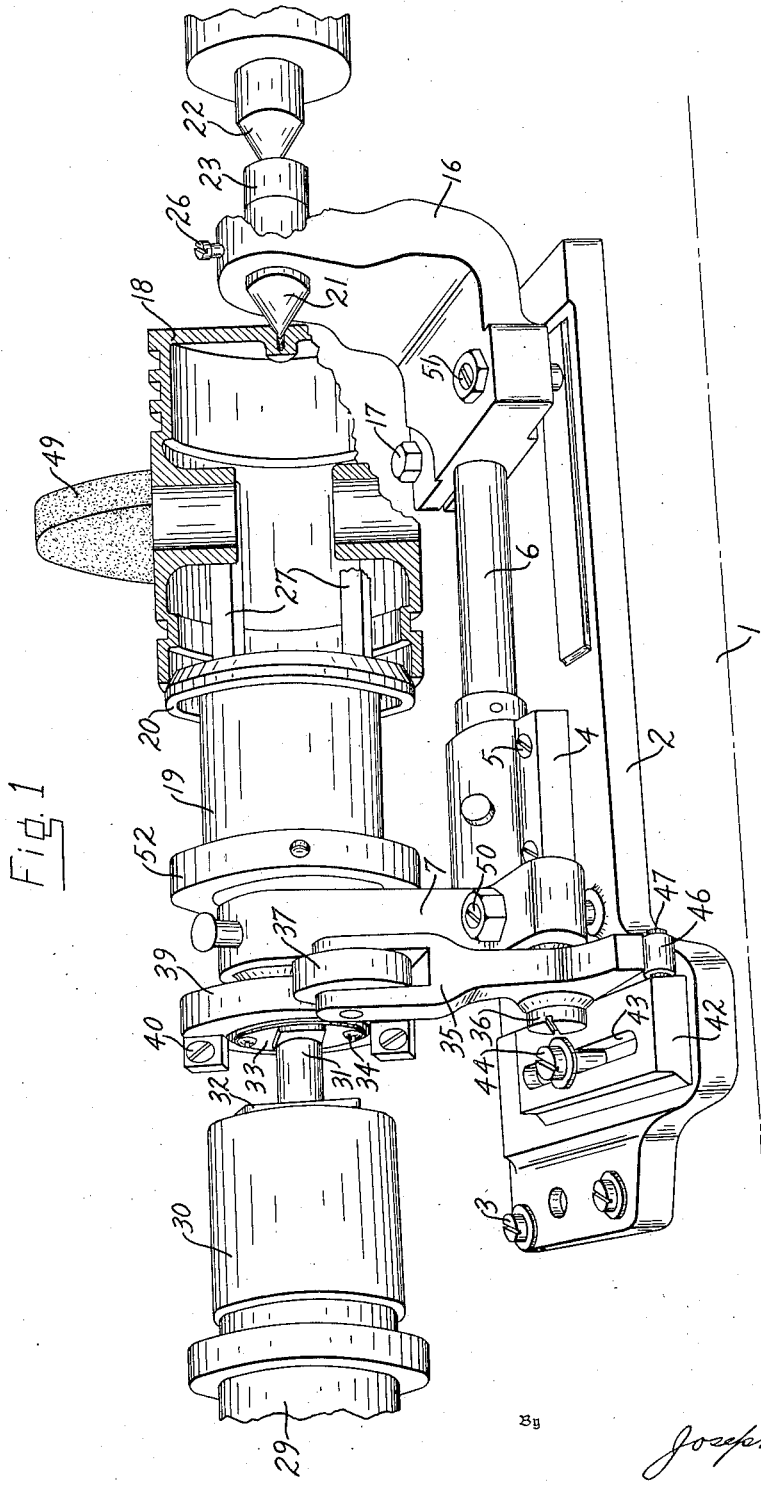
Fig. 1 is a perspective view of the machine, showing the same as an attachment to a grinder, and showing, in cross section, a conventional automobile piston held thereby, in position to be ground.

The present invention may be built as a complete machine, or may be built as an attachment to fit on a standard grinding machine, lathe, or similar apparatus to cause articles to be ground or cut to a particular shape. The tool employed for this work may be an emery wheel, a fine grinding wheel, a stationary lathe tool, a revolving tool such as commonly employed on milling machines, or any other tool used to work an article into a desired shape. The article to be worked may itself be given a movement toward and away from the tool, and may be held so that it will be given an axially tapered shape, or may be given a simple rotating movement while the tool is moved toward and away from it, and in a path to give the article the desired taper. The present invention, furthermore, is not intended to be used solely for the shaping of one particular article, but may be used in connection with a variety of different kinds of articles. It is therefore to be understood that the invention is not limited to the particular form shown but includes various modes of embodiment such as outlined above.

For the purpose of illustration, the invention is shown as an attachment for a grinding machine, and shows it secured to the bed plate of such a machine. A conventional automobile piston is shown held in position to be properly shaped by the grinding wheel.

The attachment receives its power from the head of the grinder, and has mechanism to cause the piston to be both rotated and moved toward and from the grinding wheel.

An adjusting mechanism is provided so that the amount of movement toward and from the grinding wheel may be varied at will, and without the duplication of control parts.

An adjustment for the tail piece also is provided, to make it possible to give the piston a tapered shape axially as well as an irregular shape radially, in a single operation.

The disclosure also shows the piston being fed, positively, into the path of the grinding wheel, as distinguished from being spring fed.

The control cam used to give the piston its movement toward and from the grinding wheel is shown as made of two pieces so as to be easily applied to the machine. The two parts of the cam are shown held together by screws, so that the cam may be loosened and rotated about its mounting to place it in proper angular relation to the piston.

Detailed description

In the drawings 1 (Fig. 1) indicates the bed plate of a conventional grinding machine, on which is secured a base plate 2 for the mechanism embodying the present invention. The base plate 2 may be held to the bed plate 1 by any suitable means such as screws 3.

A trunnion 4 is secured to the base plate 2 by screws 5, and embraces a shaft 6 which is adapted to be oscillated therein. An upright 7 is secured to one end of the shaft 6 by a key 8 (Fig. 2) and carries a forwardly extending arm 9 and a rearwardly extending shoulder 10.

Figure 7:
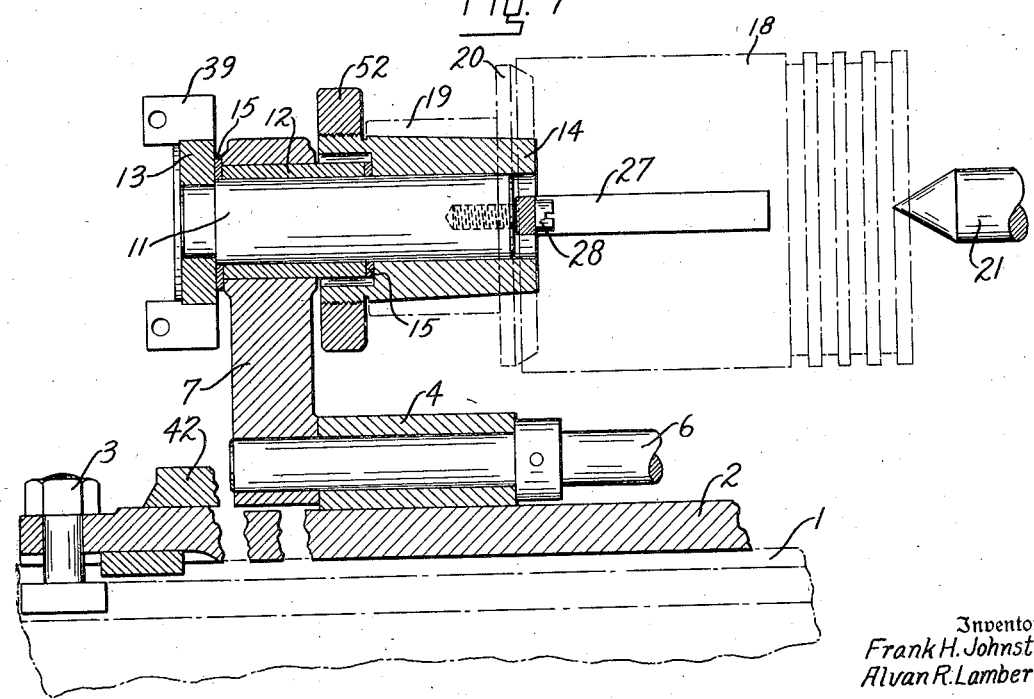
Fig. 7 is a sectional front elevation of the cam and head piece.

A drive shaft 11 (Fig. 7) is rotatably mounted in a long bushing 12 secured in the upright 7, and has secured thereto, at its ends, a hub disc 13 and a head cone 14. Thrust washers 15 are provided to prevent end play of the drive shaft 11.

Figure 4:
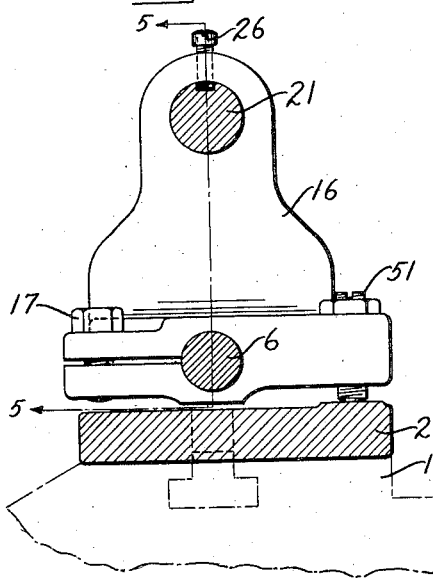
Fig. 4 is a side elevation of the tail piece, showing the taper adjusting screw.
Figure 5:
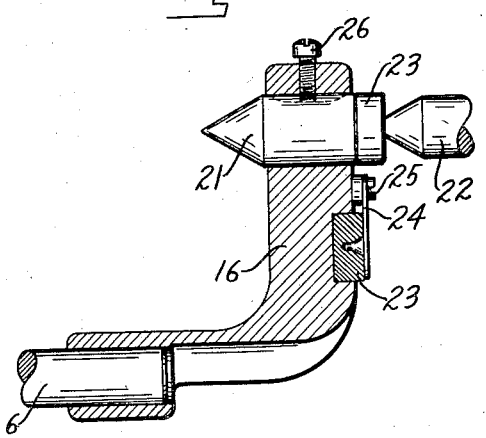
Fig. 5 is a sectional front elevation of the tail piece.

A tail piece 16 (Fig. 1) is clamped to the right hand end of shaft 6 by a screw 17 (see also Figs. 4 and 5), so as to oscillate with the shaft 6 and upright 7. The piston 18 is held between the upright 7 and tail piece 16 by a seating ring 19 (Figs. 1 and 7) tapered internally to fit over the head cone 14, and tapered on its flange 20 to hold the skirt of the piston 18. The head of the piston is held by a short tail center 21 (Fig. 5) held in place by the tail center 22 of the grinder. The tail center 22 fits into a disc 23 inserted between the tail centers for a purpose to be later described. The disc 23 is also shown lying in a pocket in the tail piece, where it is placed for safe keeping when the machine is not in use. The disc is held in the pocket by a plate 24 pivoted on the screw 25. A set screw 26 extending in a slot in the tail center 21 prevents the same from rotating and from becoming dislodged from its bearing when the machine is not in use.

A U shaped piece 27 (Figs. 1 and 7) is secured to the end of the shaft 11 by a screw 28 and is prevented from rotating relative to the shaft by lying in cut-away portions of the head cone 14. This piece 27 is adapted to lie inside the piston and contact the outside of the wrist pin journals, to act as a drive member for the piston when the shaft 11 is rotated.

The shaft 11 and piston are rotated by the power shaft in the head stock of the grinding machine, which power shaft is indicated at 29 (Fig. 1). The end of the shaft 29 is tapered so as to fit neatly inside the internally tapered cylinder 30. This connection resembles the one already described, between the head cone 14 (Fig. 7) and the seating ring 19.

The right hand end of the cylinder 30 is closed, and has secured thereon a double universal joint connection 31 lying between this cylinder and the head piece of the attachment. The manner of attaching this universal joint connection, and its particular form are not, however, essential to the present invention. It is believed sufficient to merely state that it is composed of a bar 32 secured to each end of the short shaft bearing the numeral 31, and having a flexible plate 33 secured to each bar 32. The plates 33 are secured, by screws 34, to bosses extending from the hub disc 13 and the end of the cylinder 30.

This connection, and the radially slidable connections between the tail center 21 and the disc 23, together allow a radial movement (backward and forward as viewed in Fig. 1) of the shaft 11, piston 18 and tail piece 16, using shaft 6 as a pivot. This radial movement amounts to only a small fraction of an inch in the grinding of automobile pistons, so that for this particular work the form of universal joint shown is sufficient.

The means for controlling the radial movement of these parts will now be described. A lever 35 (Fig. 2) is pivoted to the arm 9 at 36 and carries, at its upper end, a roller 37 adapted to revolve on the pin 38, and ride against the outer surface of a cam 39. This cam is made in two pieces drawn together by screws 40 so as to grip the hub disc 13 and move therewith. The lower arm 41 of the lever 35 extends toward the front of the attachment and has a substantially horizontal under edge.

Figure 2:
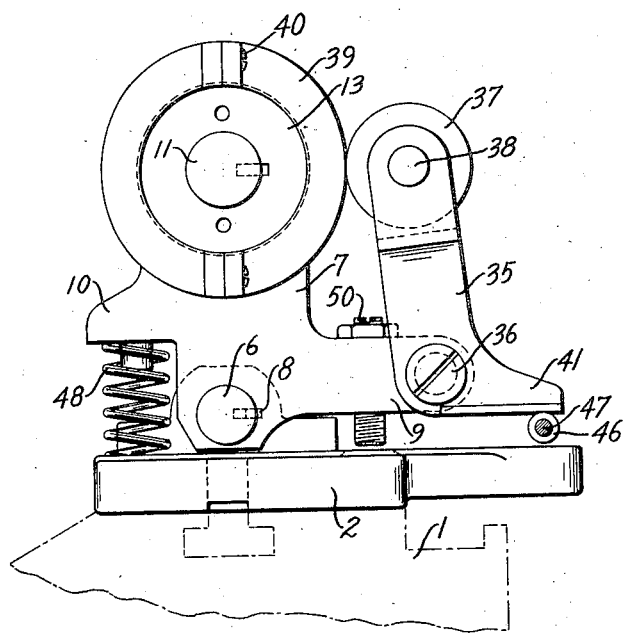
Fig. 2 is a side elevation of the cam together with its mounting and the lever and roller moved thereby.
Figure 3:
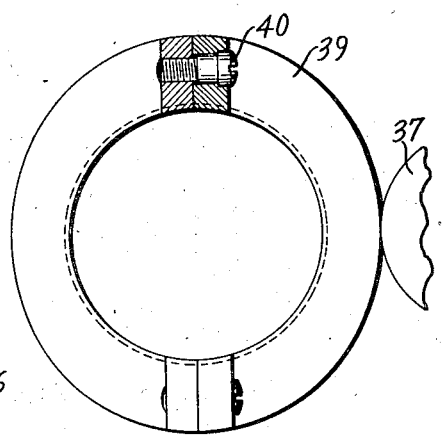
Fig. 3 is a detailed side view of the cam.
Figure 6:
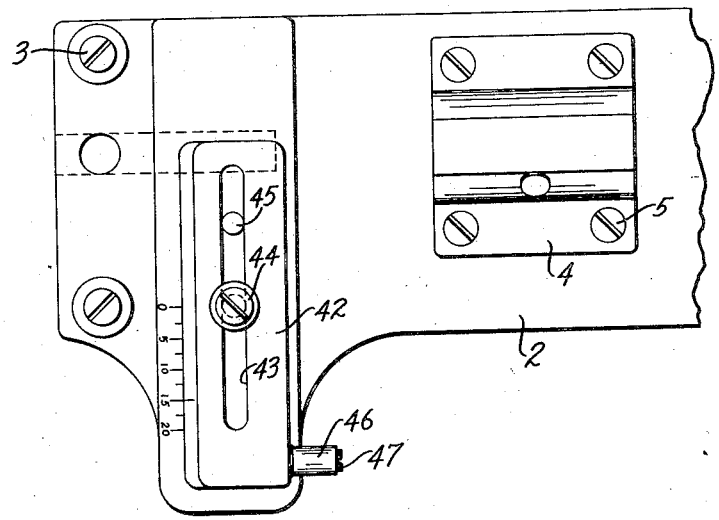
Fig. 6 is a top view of the adjusting mechanism that controls the degree of effectivity of the cam.

An adjusting slide 42 (Fig. 6) lies on the base plate 2 of the attachment, and has a slot 43 therein embracing a screw 44 and a stationary stud 45 to provide for adjustment thereof forwardly and rearwardly of the attachment. Tightening of the screw 44 will hold the slide 42 in its set position. Graduations on the base plate 2 act as a guide in adjusting the slide. A roller 46 is mounted on a screw stud 47 extending from the side of the slide 42, and lies under the arm 41 (Figs. 1 and 2). A strong spring 48 is situated between the base plate 2 and the shoulder 10, and tends to rock the head assembly, together with the lever 35, clockwise about the pivot shaft 6, the roller 46 and the contact between the roller 37 and cam 39 blocking such movement, however.

From this construction it is apparent that rotation of the power shaft 29 will rotate the shaft 11 and cam 39, causing the lever 35 to oscillate a small amount about the pivot 36. This movement of the lever 35 will, because of the arm 41 resting on the roller 46, oscillate the head assembly, tail piece and piston a small amount about the shaft 6 as a pivot, the spring 48 effecting the return stroke of each oscillation.

This movement causes the piston to be fed toward and away from the grinding wheel 49 (Fig. 1) mounted and revolving in the conventional manner. The amount of oscillation given the piston and the particular timing of the oscillation of course depend upon the particular shape of the cam 39.

It is also apparent that by loosening the screw 44 and changing the setting of the slide 42, a different amount of oscillation may be imparted to the piston, resulting in a greater or lesser amount of grinding at a particular place or places on the piston.

If it is desired that the piston be ground absolutely round, the slide 42 is moved either one way or the other to such an extent that the roller 46 will not contact the arm 41. This will nullify the effect of the cam 39 and lever 35. A set screw 50 (Fig. 2) is threaded in the arm 9 and extends downwardly so as to rest on the base plate 2 and act as an adjustable support for the head piece and associated parts for this type of operation.

It will be seen that in the oscillation of the piston toward and from the grinding wheel, the motion toward the wheel is imparted by a positive force, while the motion away from the wheel is imparted by the spring 48. This positive feed of the piston to the wheel insures a complete grinding, and is essential when a considerable amount of material is to be removed from the piston at one traversal of the grinding wheel.

When it is desired to give the piston, or other article being worked, a shape that tapers axially, as well as a particular configuration radially, it is merely necessary to change the position of the tail piece 16 relatively to the shaft 6 and upright 7. This is conveniently done by loosening the clamp screw 17 and using a set screw 51 threaded in the lower portion of tail piece 16 to adjust for the amount of taper desired. The set screw, of course, will be backed away after the adjustment is made and the screw 17 retightened.

Since the amount of taper needed in the grinding of automobile pistons is very slight, no universal connection is needed between the flange 20 and the piston, since these parts are susceptible of sufficient relative slippage to compensate for the small amount they are out of line axially. For other articles needing a large amount of taper, a universal connection between the article and the seating ring 19 could be applied.

A threaded ring 52 (Fig. 7) is applied to the head cone 14 for loosening the seating ring 19 therefrom, when it is desired to change the ring for one a different size or for another type of holder.

In the use of the machine, the proper relation between the piston and the cam may be secured by first placing the piston in the machine, in place to be ground, and rotating it until it rests against its driving member 27, after which the cam 39 is loosened, properly adjusted with regard to the position of the piston, and tightened.

The pistons are changed by backing away the tail stock 22 and the tail piece 21.

If it is desired to work on a piston substantially shorter than the one shown, the screw 17 is loosened and the tail piece moved to the left along the rod 6 the desired amount, after which the screw 17 is retightened.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claim which follows.

What is claimed is:

In a piston grinding machine, a piston supporting shaft, a pivoted mounting therefor, a cam secured to the shaft, a lever pivoted on the mounting and cooperating with the cam to rock the mounting, a slide having a portion cooperating with the lever to act as a fulcrum therefor, means whereby the slide may be shifted to vary the amount of rocking imparted to the mounting, a power shaft operating on a fixed pivot, and a flexible direct connection between the power shaft and the piston supporting shaft for rotating the latter.

FRANK H. JOHNSTON.
ALVAN R. LAMBERT.